United States Patent
Jones et al.

(10) Patent No.: US 10,647,552 B1
(45) Date of Patent: May 12, 2020

(54) FLY CONNECTION SYSTEM FOR A CRANE BOOM

(71) Applicant: Link-Belt Construction Equipment Co., L.P., LLLP, Lexington, KY (US)

(72) Inventors: John P. Jones, Lexington, KY (US); Derrick Wonsowski, Lexington, KY (US); Adam Mefford, Lexington, KY (US)

(73) Assignee: LINK-BELT CRANES, L.P., LLLP, Lexington, KY (US)

( * ) Notice: Subject to any disclaimer, the term of this patent is extended or adjusted under 35 U.S.C. 154(b) by 695 days.

(21) Appl. No.: 15/276,556

(22) Filed: Sep. 26, 2016

Related U.S. Application Data

(60) Provisional application No. 62/232,980, filed on Sep. 25, 2015.

(51) Int. Cl.
| | |
|---|---|
| *B66C 23/68* | (2006.01) |
| *B66C 23/70* | (2006.01) |
| *B66C 23/66* | (2006.01) |
| *F16B 19/00* | (2006.01) |

(52) U.S. Cl.
CPC .............. *B66C 23/66* (2013.01); *B66C 23/68* (2013.01); *F16B 19/00* (2013.01)

(58) Field of Classification Search
CPC ..... B66C 23/708; B66C 23/705; B66C 23/66; B66C 23/68; F16B 19/00
See application file for complete search history.

(56) References Cited

U.S. PATENT DOCUMENTS

| | | | | |
|---|---|---|---|---|
| 3,085,695 | A * | 4/1963 | Miller ................... | B66C 23/70 212/177 |
| 3,430,778 | A * | 3/1969 | Brown ................... | B66C 23/70 212/300 |
| 3,785,505 | A | 1/1974 | Keller, Jr. | |
| 3,831,771 | A | 8/1974 | Wiencek | |
| 4,141,455 | A | 2/1979 | Enderson et al. | |
| 4,621,742 | A | 11/1986 | Rathi | |
| 5,111,945 | A | 5/1992 | Hull et al. | |
| 5,628,416 | A * | 5/1997 | Frommelt ............. | B66C 23/705 212/292 |
| 5,673,805 | A | 10/1997 | Chaffin | |
| 6,131,750 | A | 10/2000 | Harrington | |
| 6,213,318 | B1 * | 4/2001 | Walker ................... | B66C 23/70 212/177 |

(Continued)

*Primary Examiner* — Michael E Gallion
(74) *Attorney, Agent, or Firm* — Kling & Schickli, PLLC

(57) ABSTRACT

An interlock system includes first and second connectors for connecting a boom section to a boom. A first cover is provided for covering an actuator for actuating a first connector when a second connector is withdrawn from a position for connecting the boom section to the boom. A first block may also be provided for blocking a first receiver in an operative condition to prevent the first connector from entering the first receiver. The connector may be adapted for movement along an insertion axis corresponding to a first receiver on the boom section and a second receiver on the boom, and an actuator may be provided for advancing or retracting the connector, the actuator extending generally parallel to, but offset from, the connection axis. Related methods are also disclosed, as is an axially offset actuator for actuating one or more of the connectors for connecting the boom section to the boom.

21 Claims, 19 Drawing Sheets

(56) References Cited

U.S. PATENT DOCUMENTS

| | | | | |
|---|---|---|---|---|
| 6,601,719 B2* | 8/2003 | Harrington | ............ | B66C 23/705 |
| | | | | 212/270 |
| 7,878,346 B1 | 2/2011 | Watts et al. | | |
| 8,522,988 B2* | 9/2013 | Tanaka | .................... | B66C 23/42 |
| | | | | 212/299 |
| 8,534,474 B2* | 9/2013 | Holly | ...................... | B66C 23/70 |
| | | | | 212/177 |
| 9,090,438 B2* | 7/2015 | Krebs | ................... | B66C 23/708 |
| 9,187,296 B2* | 11/2015 | Walker | ................... | B66C 23/70 |
| 2001/0052506 A1* | 12/2001 | Richter | ................ | B66C 23/705 |
| | | | | 212/177 |
| 2002/0056693 A1* | 5/2002 | Stowasser | ............ | B66C 23/705 |
| | | | | 212/292 |
| 2003/0057172 A1* | 3/2003 | Harrington | ........... | B66C 23/705 |
| | | | | 212/292 |
| 2004/0238471 A1* | 12/2004 | Lissandre | ............... | B66C 23/70 |
| | | | | 212/177 |

* cited by examiner

FLY CONNECTION SYSTEM FOR A CRANE BOOM

This application claims the benefit of U.S. Provisional Patent Application Ser. No. 62/232,980, the disclosure of which is incorporated herein by reference.

FIELD OF THE INVENTION

This disclosure relates generally to a crane with a lifting booms and, more particularly, to a system for connecting an extension section, or fly, to a crane boom.

BACKGROUND OF THE INVENTION

A crane boom, such as one comprising a plurality of nested, telescoping sections, typically includes an auxiliary boom section called a "fly" comprised of welded tubular and plate structures. This fly can be used to extend the reach of the crane when moved from a stowed position alongside of the boom to an inline condition. In order to position the fly in this manner, or re-position it when not in use, a sequence of inserting and removing pins must be precisely followed, or else the fly can inadvertently become detached from the boom.

Others have proposed complicated systems for engaging the pins to prevent removal in the incorrect sequence. However, such systems are subject to failure based on misuse (such as if too much force is applied to the pin to cause it to drive through any blocking element intended to stop the improper insertion or removal). Known past systems are also not intuitive, and can still lead the operator to attempt to remove the pins in the incorrect sequence, thus wasting time and effort and potentially leading to the inadvertent detachment of the fly.

Accordingly, a need exists for an improved and simplified system which eliminates the aforementioned issues and others not yet discovered. The system would operate such that the condition of the fly relative to the boom can be easily determined, such that time and effort is not wasted attempting to perform an incorrect sequence of operations to pivot the fly to the operative condition. The system would also make the pin insertion and removal sequence intuitive, so that even an unfamiliar operator may perform the steps in the correct order without uncertainty.

SUMMARY

According to one aspect of the disclosure, an interlock system for connecting a boom section to a boom. The system comprises first and second connectors for connecting the boom section to the boom. An actuator is provided for actuating the first connector. A first cover is also provided for covering the actuator when the second connector is withdrawn from a position for connecting the boom section to the boom.

In one embodiment, a second cover is provided for covering access to a second actuator for actuating the second connector when the first connector is withdrawn from a position for connecting the boom section to the boom. A first aperture may be provided on the boom section for receiving the first connector, and a first block serves to block the first aperture when the first connector is withdrawn from a position for connecting the boom section to the boom. A second aperture may also be provided on the boom section for receiving the second connector, and a second block for blocking the second aperture when the second connector is withdrawn from a position for connecting the boom section with the boom. A first mount may be provided on the boom for moving the first block from blocking the first aperture, and a second mount may also be provided for moving the second block from blocking the second aperture.

The system may include a first controller for controlling the movement of the first cover based on the movement of the second connector. A second controller may also be provided for controlling the movement of the second cover based on movement of the first connector. The actuator may comprise a screw axially offset from the first connector, the screw having a head adapted for engaging a tool, the head being covered by the first cover in the operative condition.

According to these or other aspects of the disclosure, an apparatus for extending the reach of a boom may comprise a boom section for connecting to the boom via a first connector for associating with a first receiver on the boom section. A first block may be provided for blocking the first receiver in an operative condition to prevent the first connector from entering the first receiver.

In one possible embodiment, the first block comprises a plate mounted to the boom section for at least partially covering the first receiver in the operative condition. The plate may be movably mounted, and the boom includes a mount for automatically moving the plate from the operative condition. The first block may alternatively comprise a pin mounted to the boom section for at least partially blocking the first receiver in the operative condition. In any case, a spring may be provided for biasing the first block to the operative condition. A second block may also be provided for blocking a second receiver in an operative condition to prevent a second connector from connecting the boom section to the boom.

In these or other embodiments, an actuator may be provided for actuating the first connector. A first cover may be provided for covering the actuator when the second connector is withdrawn from a position for connecting the boom section to the boom. A second cover may also be provided for blocking access to a second actuator for actuating the second connector when the first connector is withdrawn from a position for connecting the boom section to the boom. A first controller may also be provided for controlling the movement of the first cover based on the movement of the second connector, as may a second controller for controlling the movement of the second cover based on movement of the first connector.

Still a further aspect of the disclosure pertains to an apparatus for connecting a boom section to a boom. The apparatus comprises a connector for connecting the boom section to the boom, the connector being adapted for movement along an insertion axis corresponding to a first receiver on the boom section and a second receiver on the boom. An actuator is provided for advancing or retracting the connector. The actuator extends generally parallel to, but offset from, the insertion axis.

In one embodiment, the actuator comprises a screw. The screw may be radially offset from the insertion axis of the first connector. The screw includes a head adapted for engaging a tool.

Yet a further aspect of the disclosure pertains to a method of providing an interlock system for use in connection with a boom section for being attached to a boom by an operator. The method comprises providing a first actuator for actuating a first connector for connecting the boom section to the boom and blocking the operator's access to the first actuator unless a second connector is connecting the boom section to the boom. The method may further include the step of blocking the operator's access to a second actuator for the second connector unless the first connector is connecting the boom section to the boom. Still further, the method may include using the first connector to connect the boom section to the boom, unblocking the operator's access to the second connector, and withdrawing the second connector from connecting the boom section to the boom.

A further aspect of the disclosure pertains to a method for preventing insertion of a first connector through a first receiver on a boom section. The method comprises blocking the first receiver to prevent the insertion of the first connector. The method may further include the step of controlling the position of a cover for a second connector based on the position of the first connector, as well as controlling the position of a cover for the first connector based on the position of a second connector. The method may also include the step of blocking a second receiver to prevent the insertion of a second connector.

BRIEF DESCRIPTION OF THE DRAWINGS

The accompanying drawing figures incorporated herein and forming a part of the specification, illustrate several aspects of the inventive fly connection system and, together with the description, serve to explain certain principles thereof. In the drawing figures.

Reference will now be made in detail to the present embodiments of the fly connection system, examples of which are illustrated in the accompanying drawing figures.

DETAILED DESCRIPTION

Figure 1:
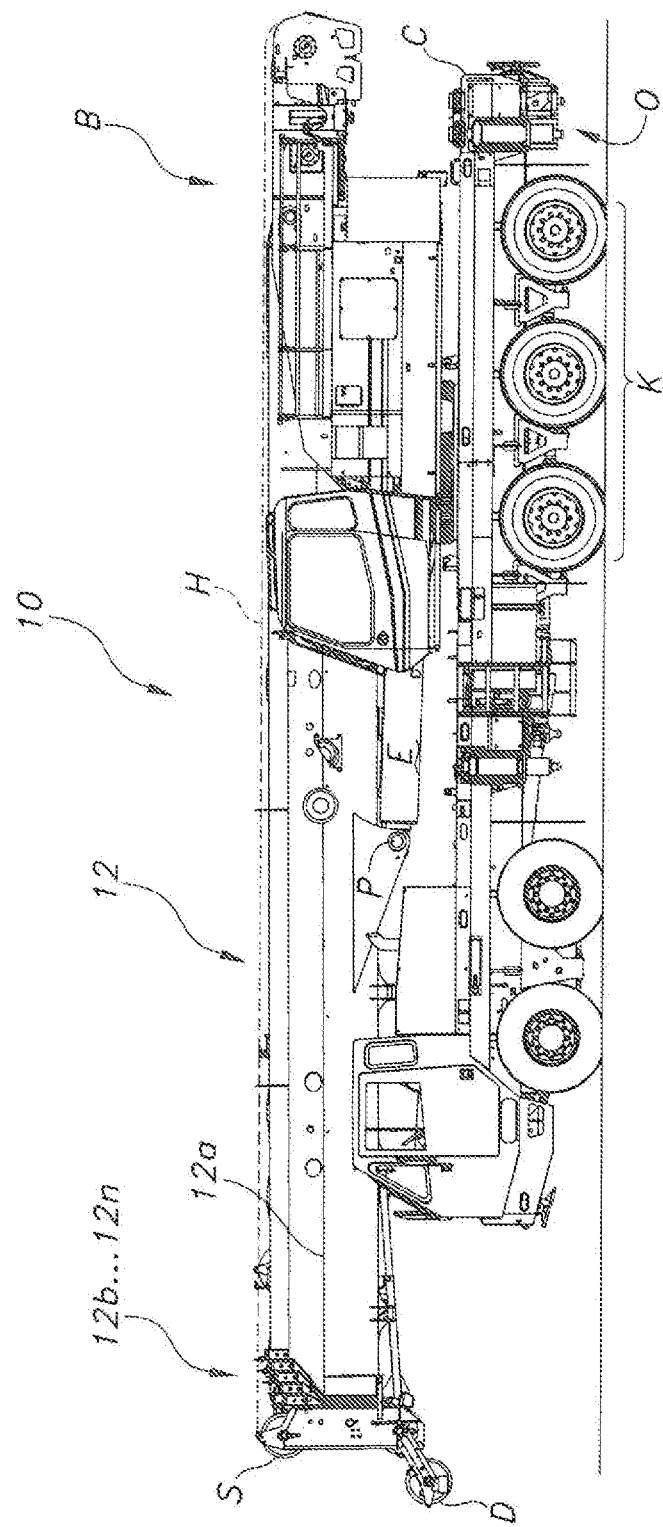
FIG. 1 is an overall side elevational view of a vehicle including a lifting boom, such as a crane, to which this disclosure may have applicability.

Reference is now made to FIG. 1, which provides an overall perspective view of a mobile crane 10 for which the inventions described herein may have utility, but is not intended to limit their applicability to a particular environment. In the embodiment illustrated in FIG. 1, this crane 10 includes a telescoping boom 12 having at least two generally tubular boom sections, such as a base section 12a and one or more extensible sections 12b . . . 12n. The first or outer base boom section 12a is pivotally mounted on a bodily rotatable base B supported by a chassis C having ground-engaging structures (e.g., wheels K or crawler tracks and outriggers O), while the telescoping boom sections 12b . . . 12n are telescopically received within the first or base boom section 12a. An internal hydraulic cylinder (not shown) is provided to move the telescoping boom sections 12b . . . 12n relative to each other in a manner known in the art, and a lifter E, such as an external cylinder, connects with the boom 12 at a connection point P, and can be used to pivot it in a vertical direction in a selective fashion to lift objects using a hoist rope FI (shown in dashed line representation in FIG. 1). The hoist rope H which may extend over one or more sheaves S at the boom head D.

Figure 2:
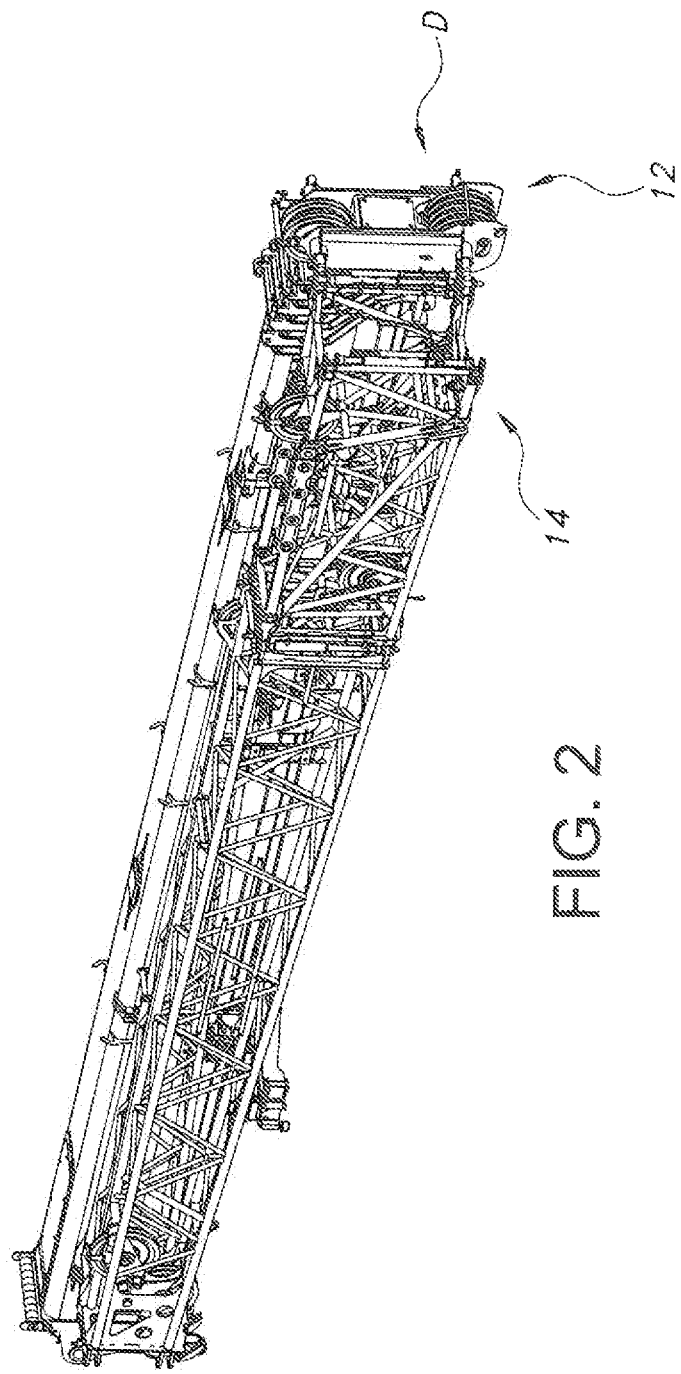
FIG. 2 is a front perspective view of the boom with an extension or fly section in a stowed condition alongside the boom.
Figure 2A:
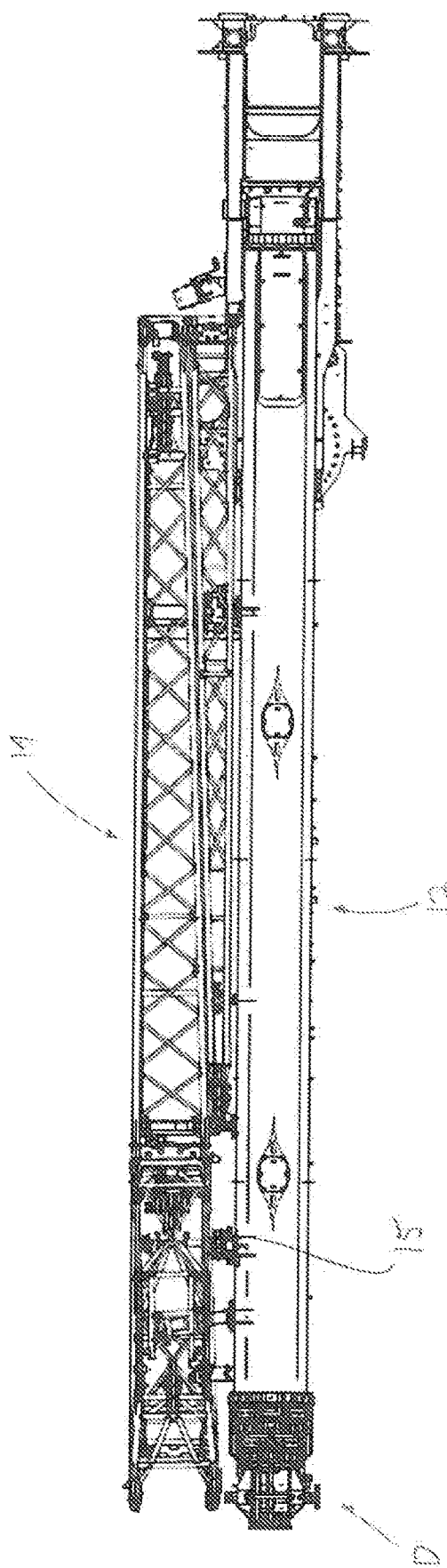
FIGS. 2A, 2B, 2C, and 2D are top views illustrating the sequence of erecting the fly section from the stowed condition.
Figure 2B:
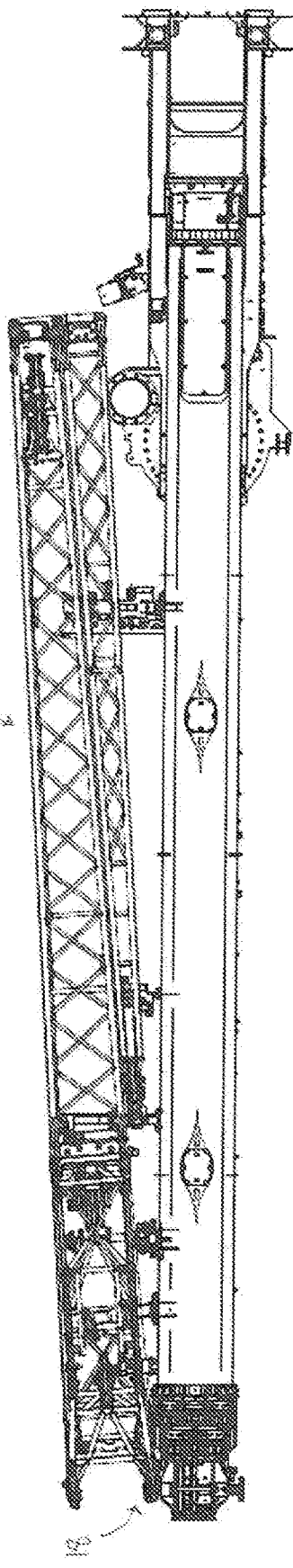
Figure 2C:
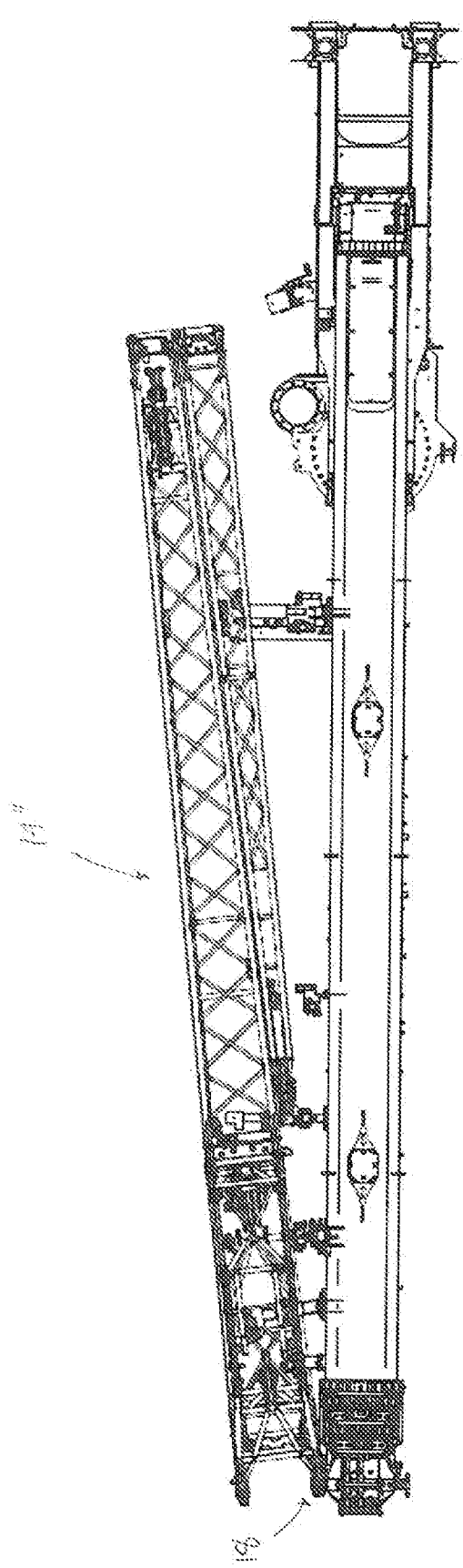
Figure 2D:
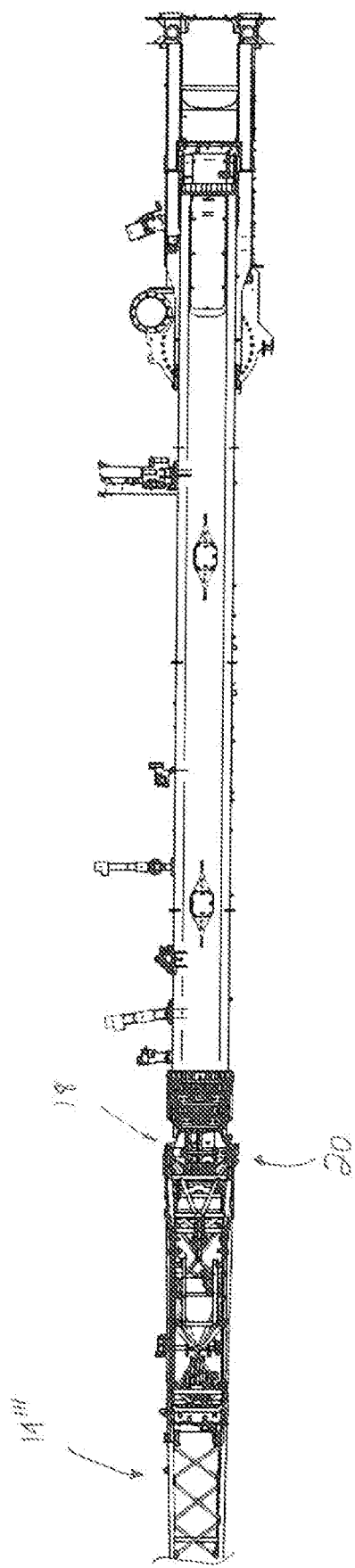
Figure 3:
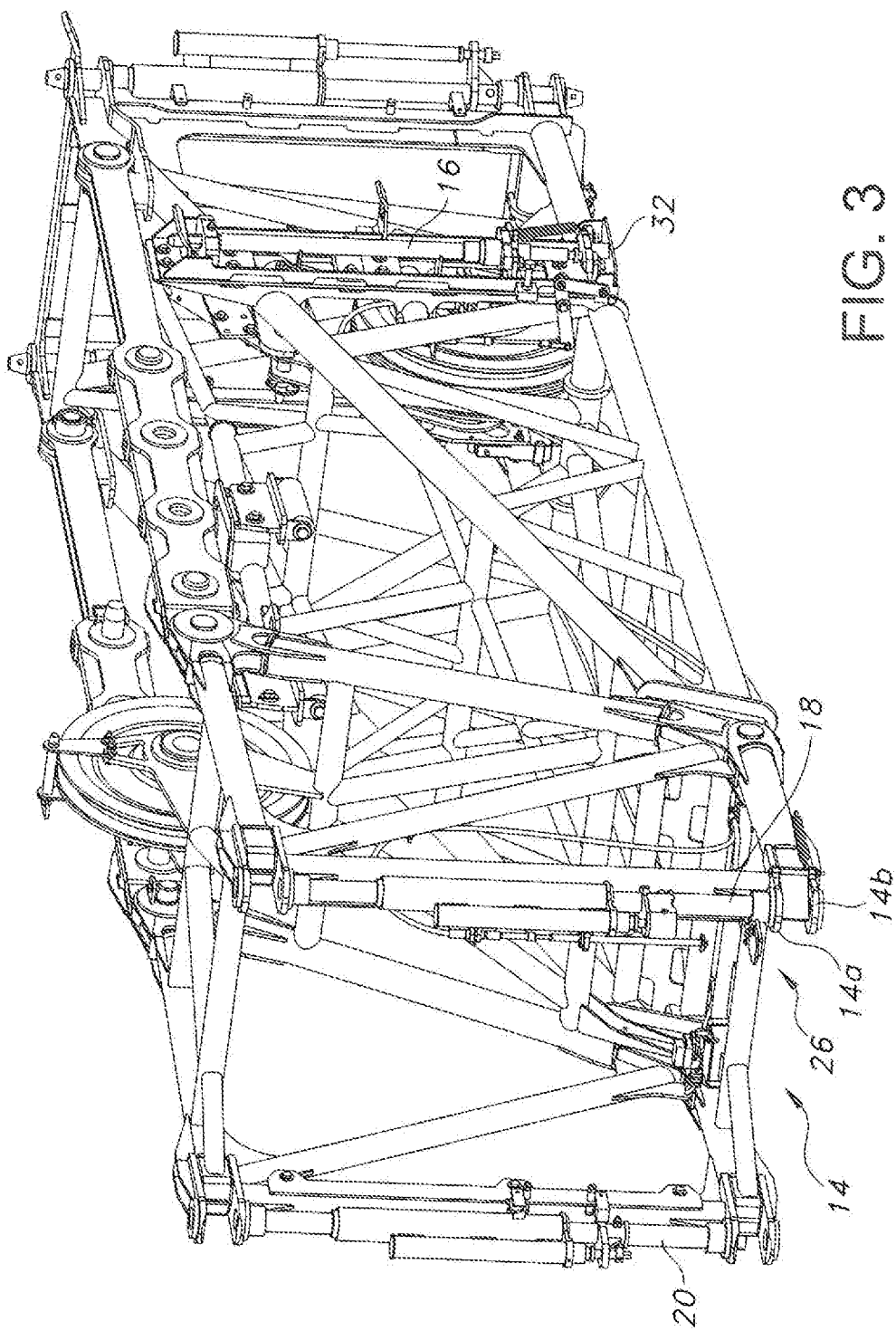
FIGS. 3 and 4 are front perspective views of the extension or fly section illustrating the nature of the connectors used to connect it to the boom.
Figure 15:
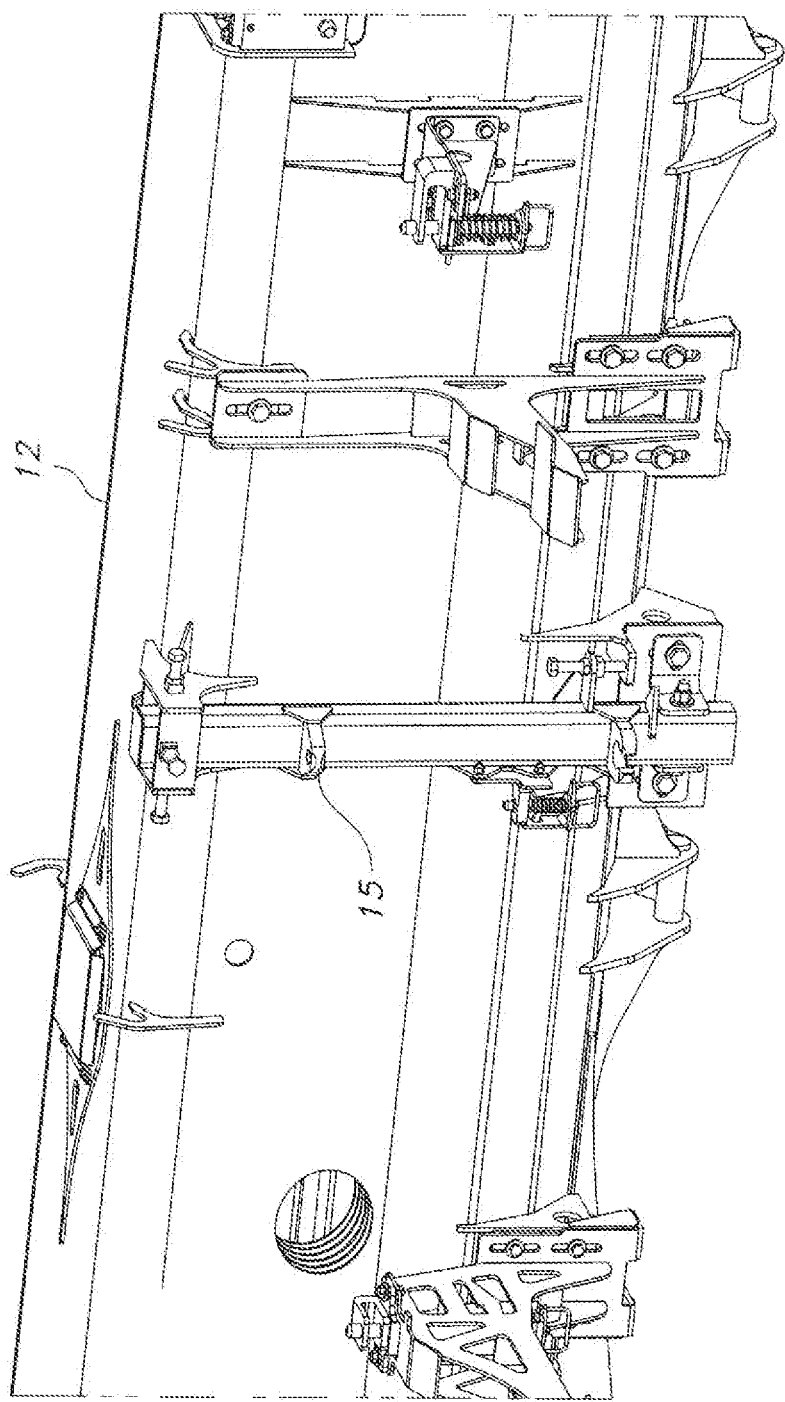
FIG. 15 is a partially cutaway close-up view of one aspect of the fly connection system according to the disclosure.

As illustrated in FIG. 2, the boom 12 may be associated with an auxiliary boom section, such as fly 14 (which may comprise a latticework body), which is shown in a stowed position alongside the boom, but it may proceed through an erection sequence as indicated in FIGS. 2A, 2B, 2C, and 2D. In this stowed position, and with further reference to FIG. 3, it can be understood that the fly 14 would be connected to the boom 12 by a "secondary" connector 16, such as a pin between adjacent sides of the boom and fly when stowed. This connector 16 may register through aligned apertures in corresponding receivers associated with the fly 14 and boom 12 (see element 15 in FIG. 2A and FIG. 15), which thus form mounts.

Figure 4:
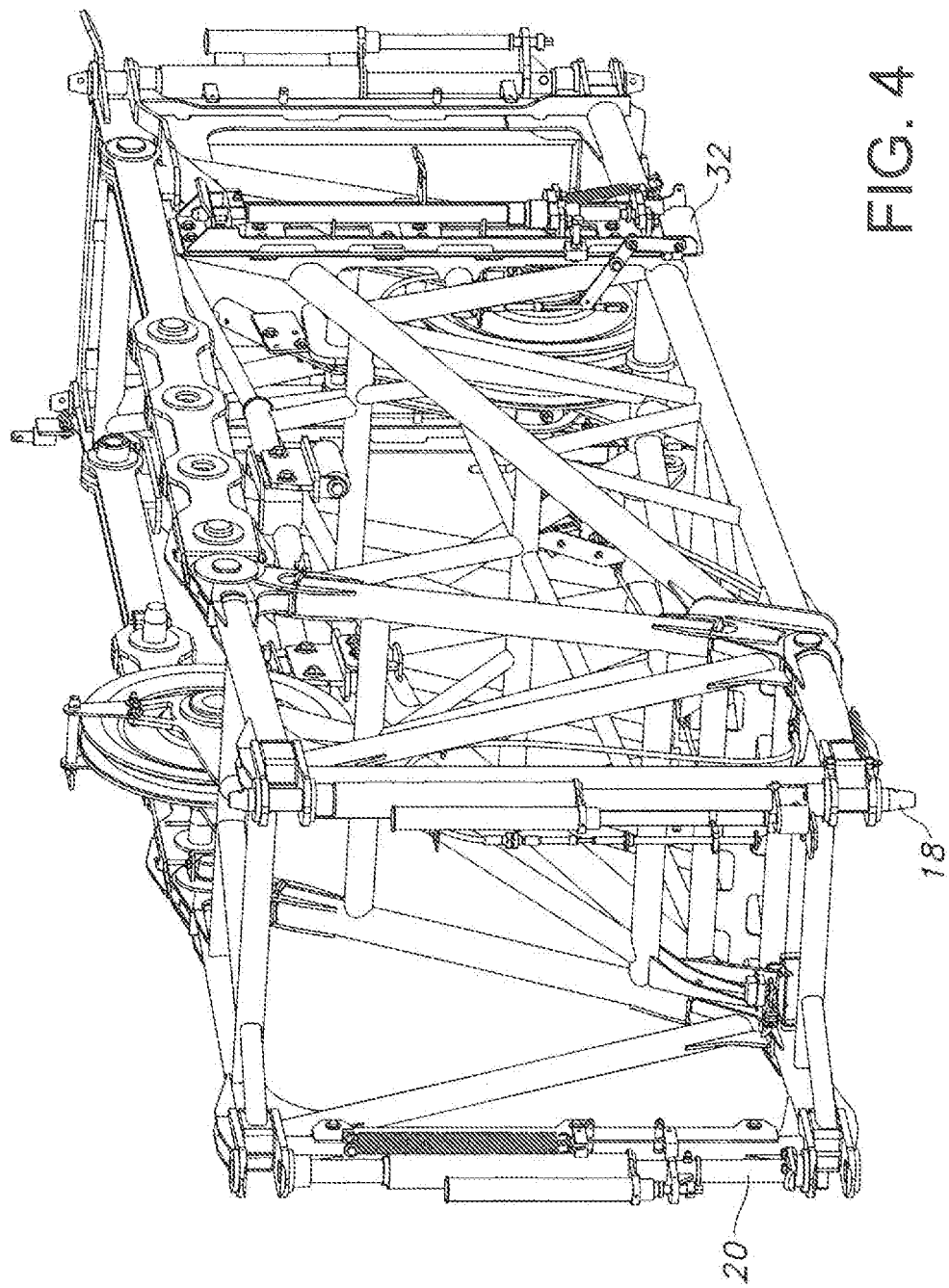
Figure 5:
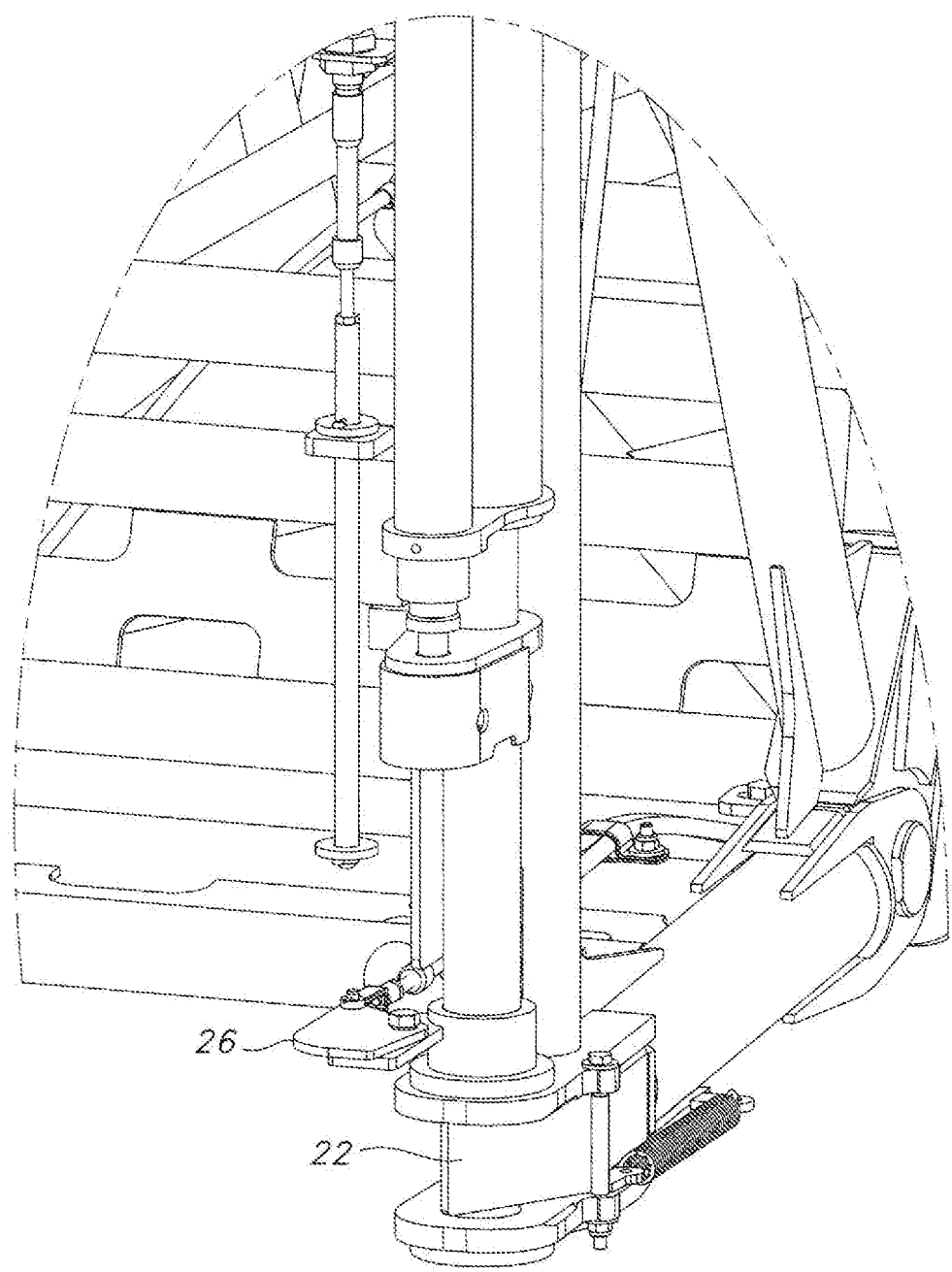
FIG. 5 is a partially cutaway close-up view of one aspect of the fly connection system according to the disclosure.
Figure 6:
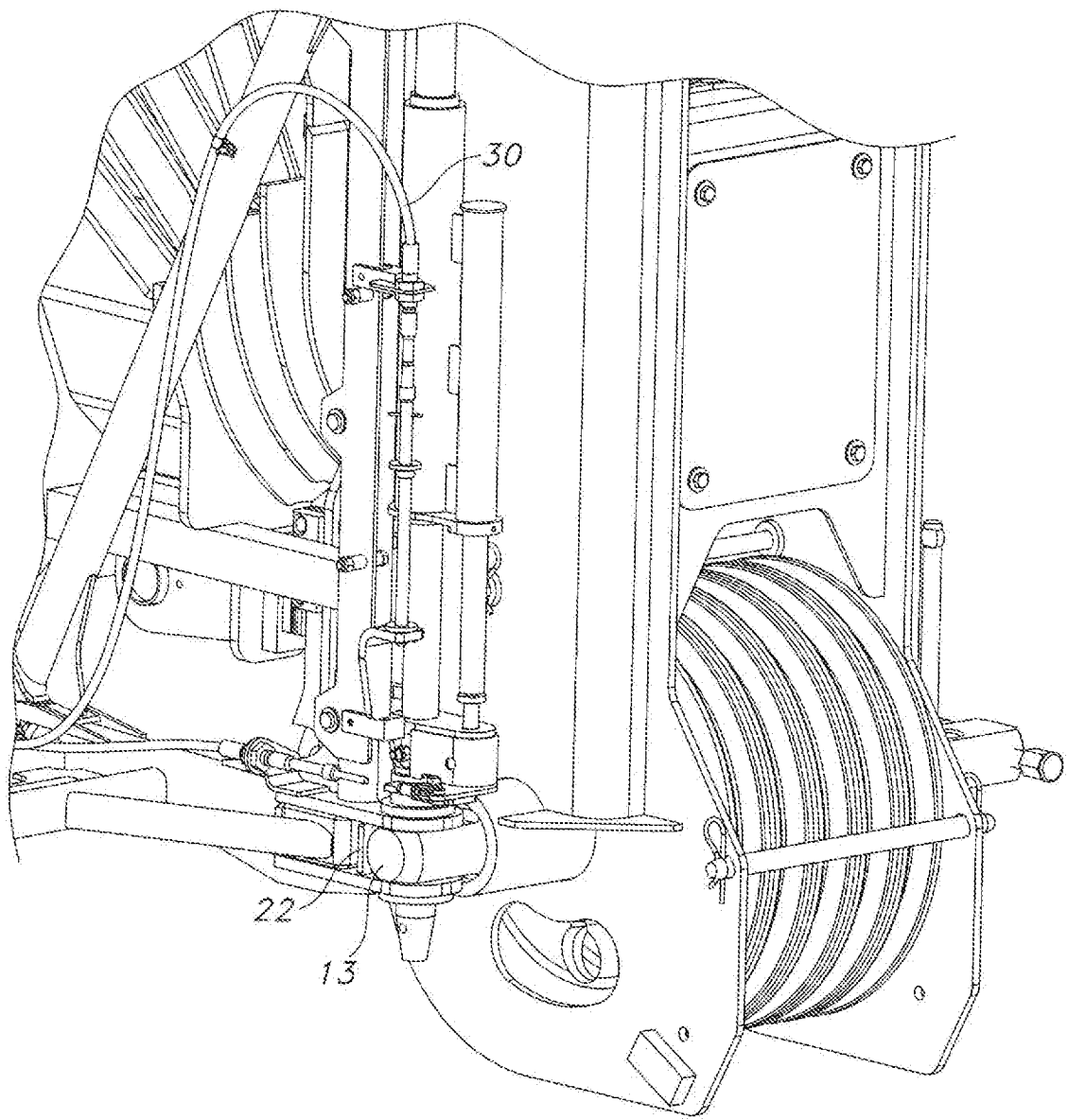
FIG. 6 is a partially cutaway close-up view of one aspect of the fly connection system according to the disclosure.

In addition to retaining the fly 14 in the stowed position, this secondary connector 16 also provides a pivot point about which the fly may partially rotate in order to associate a first "primary" connector 18, such as a pin (sometimes called a "boom head" pin), with corresponding receivers (apertures) provided by mounts on the fly and boom 12, as indicated in FIG. 4. Once the first primary connector 18 is secured in place (FIGS. 2B and 2C), the fly 14 may be pivoted about the established connection to the operative position (14''' in FIG. 2D), inline with and extending the reach of the boom 12, at which point a second "primary" connector 20 (pin), may be used to secure the fly in place on the boom head D in line with the boom 12, ready for use in lifting objects.

As should be appreciated, removing the secondary connector 16 before the first primary connector 18 is in place may have unintended consequences. Yet, as mentioned above, the condition of the fly 14 and the sequence of operation to be performed is not intuitive in past approaches to providing a lockout function. In order to prevent the incorrect sequence from being followed, an interlock system is provided for protecting the fly 14 against release or improper tampering before and during the erection procedure.

Figure 7:
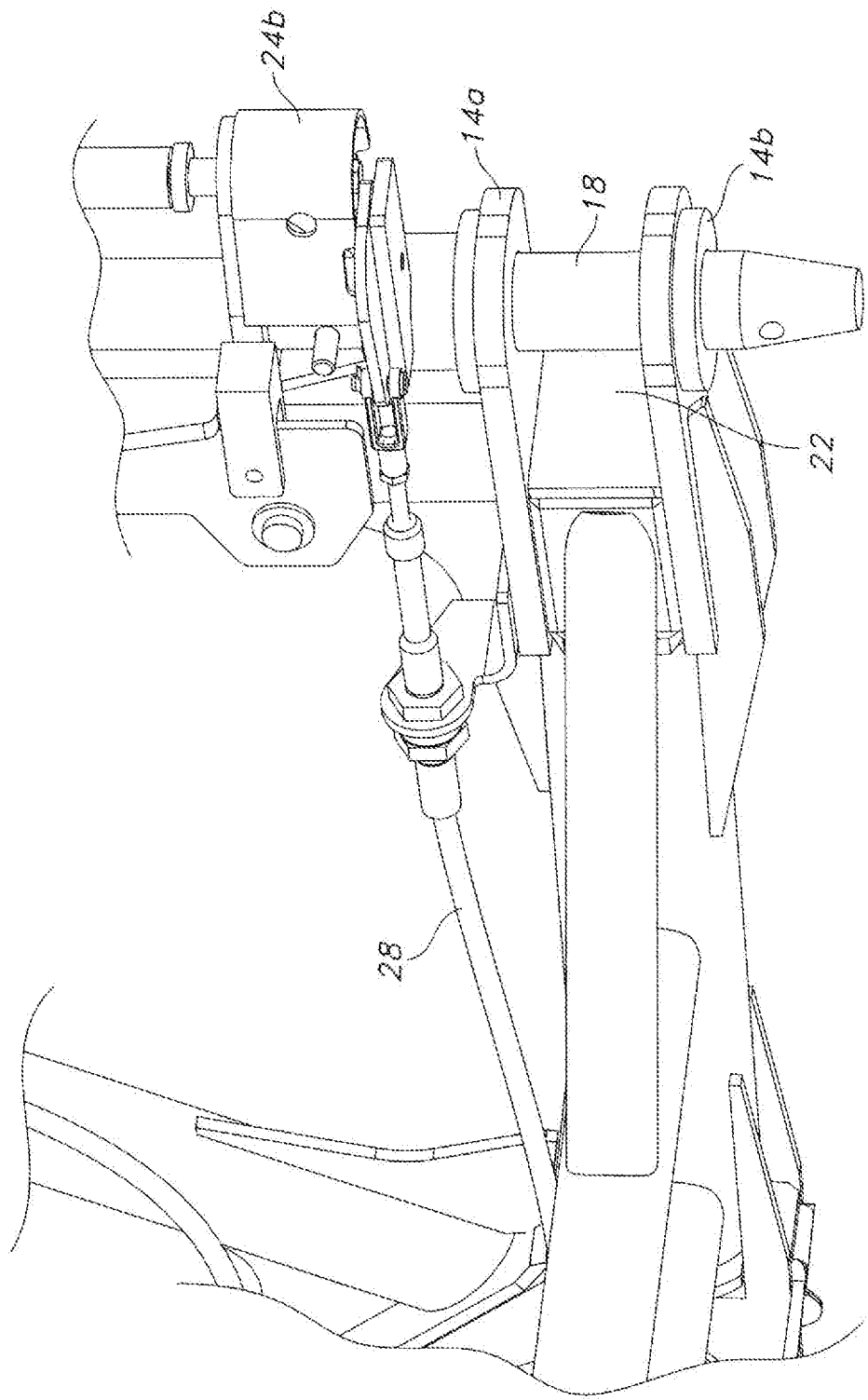
FIG. 7 is a partially cutaway close-up view of one aspect of the fly connection system according to the disclosure.

As a first measure of protection, and with reference to FIGS. 3-6, a block 22 may serve to block the first primary connector 18 from being inserted through the associated receivers 14a, 14b forming part of the fly 14 and for associating with a mount, such as a receiver 13, of the boom 12. The block 22 in the illustrated embodiment takes the form of a plate positioned in a path of the receivers 14a, 14b in a deployed position, where it may be held in place as outlined further in the description that follows. When the fly 14 pivots into position to align the receivers 14a, 14b with the receiver 13 on the boom 12 (position 14' in FIG. 2B), the boom receiver 13 engages this block 22 and pushes it away from the blocking condition (see FIG. 7, but with receiver 13 not shown). In this manner, the operator is both physically and visually able to verify that the connector 18 is in the proper position for installation through receivers 14a, 14b.

Figure 8:
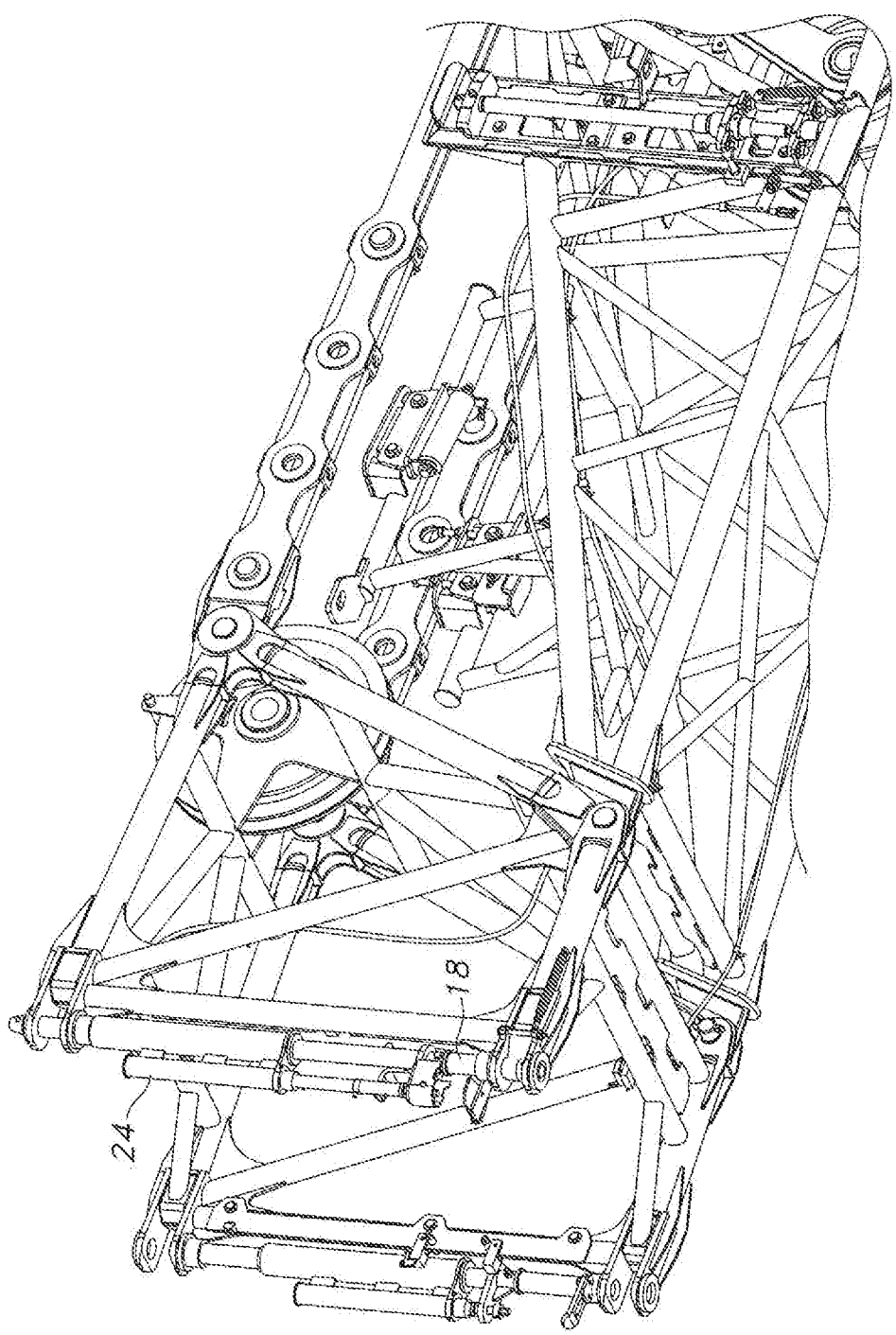
FIG. 8 is a partially cutaway close-up view of one aspect of the fly connection system according to the disclosure.
Figure 9:
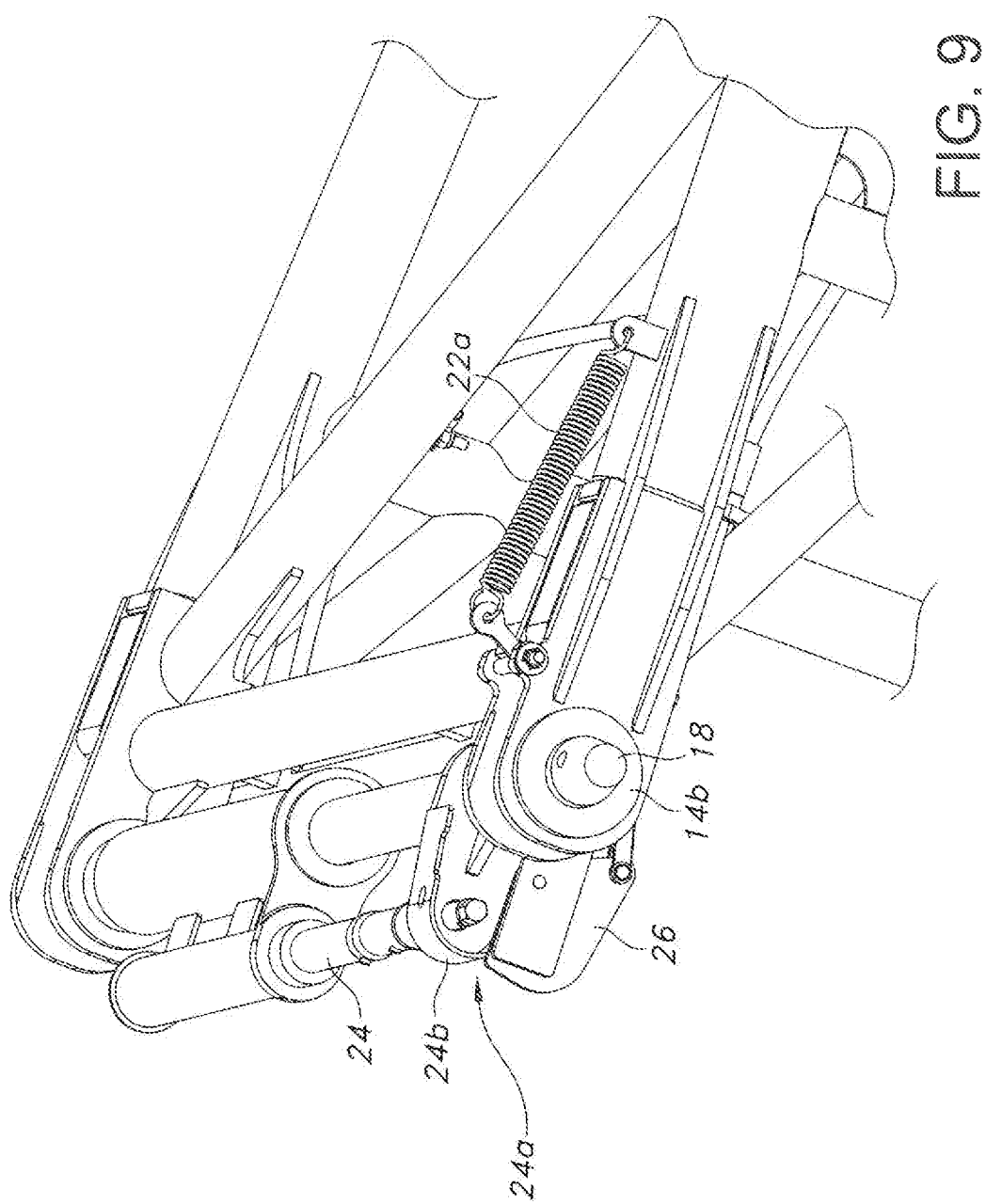
FIG. 9 is a partially cutaway close-up view of one aspect of the fly connection system according to the disclosure.
Figure 9A:
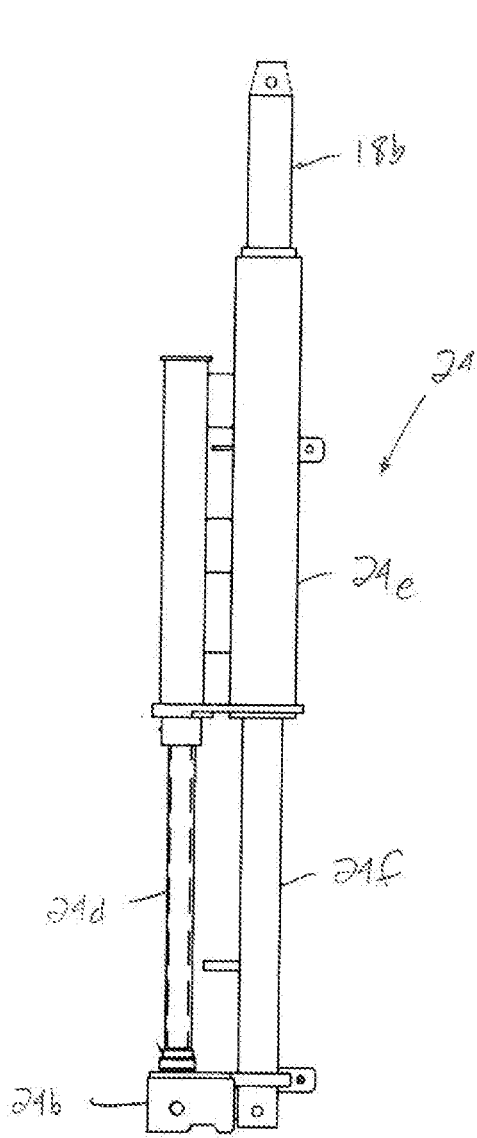
FIGS. 9A, 9B, 9C, 9D, and 9E are full and cross-sectional (FIG. 9B along line A-A of FIG. 9C) and side views of an offset screw actuator.
Figure 9B:
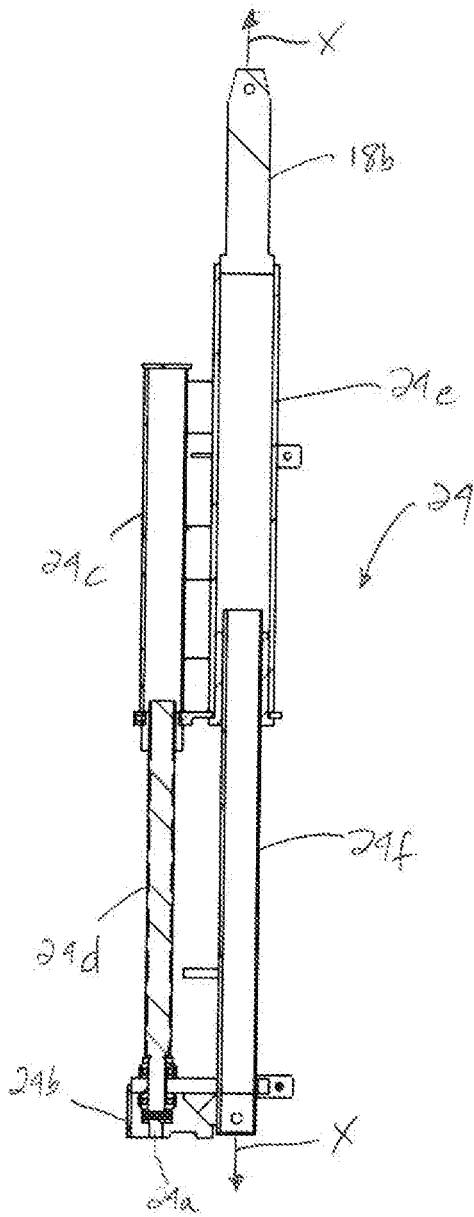
Figure 9C:
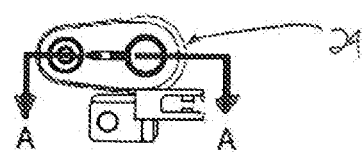
Figure 9D:
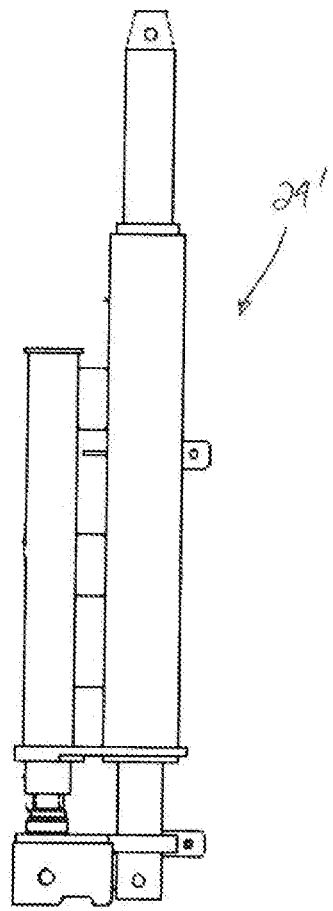
Figure 9E:
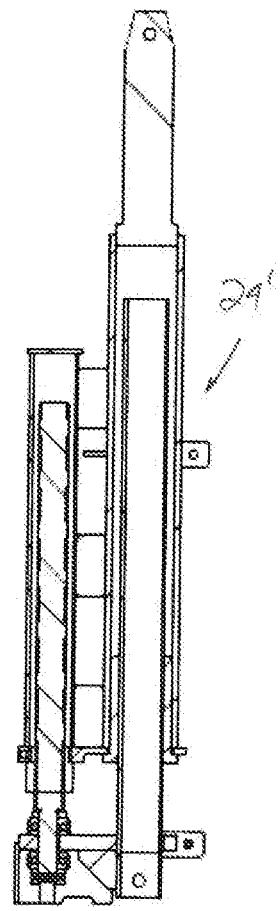

In the illustrated embodiment, and with reference to FIGS. 8-9, installation of the first primary connector 18 is achieved using an actuator 24, which serves to advance and retracted the connector. The actuator 24 may be offset from, but connected to the connector 18, such that the two move in a generally parallel manner and direction. As perhaps best shown in FIG. 9, the actuator 24 includes a head 24a adapted for being engaged by a tool for advancing or withdrawing the connector 18 from the aligned apertures of receivers 13, 14a, 14b.

Turning to FIGS. 9A, 9B, 9C, and 9D, one possible construction of the actuator 24 is shown. The actuator 24 may include a first housing 24c for receiving a screw 24d and a second connected housing 24e for telescopingly receiving a support 24f for supporting a lower part 18a of the connector 18 (see FIG. 7) at one end. The upper part 18b of the connector 18 may be associated the housing 24e for receiving the support 24f.

Actuation of the screw 24d using the head 24a (which it can be appreciated is radially spaced and offset from the axis of insertion X) thus causes the actuator 24 to extend and retract the connector 18. Correspondingly, this advances or withdraws the upper and lower parts 18a, 18b for engaging the corresponding receivers 14a, 14b (lower) or 17a, 17b (upper, see FIG. 3). The nature of this expansion and retraction can perhaps be best understood by comparing FIGS. 9A and 9B (note 24) with FIGS. 9C and 9D (note 24').

From this view, it can also be understood how the block 22 is pivotally mounted to the fly 14 for moving between the blocking and withdrawn conditions. Also, it can be appreciated that the block 22 is associated with an assist, such as a spring 22a, for urging the block to the blocking condition. With combined reference to FIG. 7, it can also be understood that an optional cover in the form of a shroud 24b may be provided for further aiding in preventing an operator from gaining access to the head 24a of the actuator 24.

Figure 10:
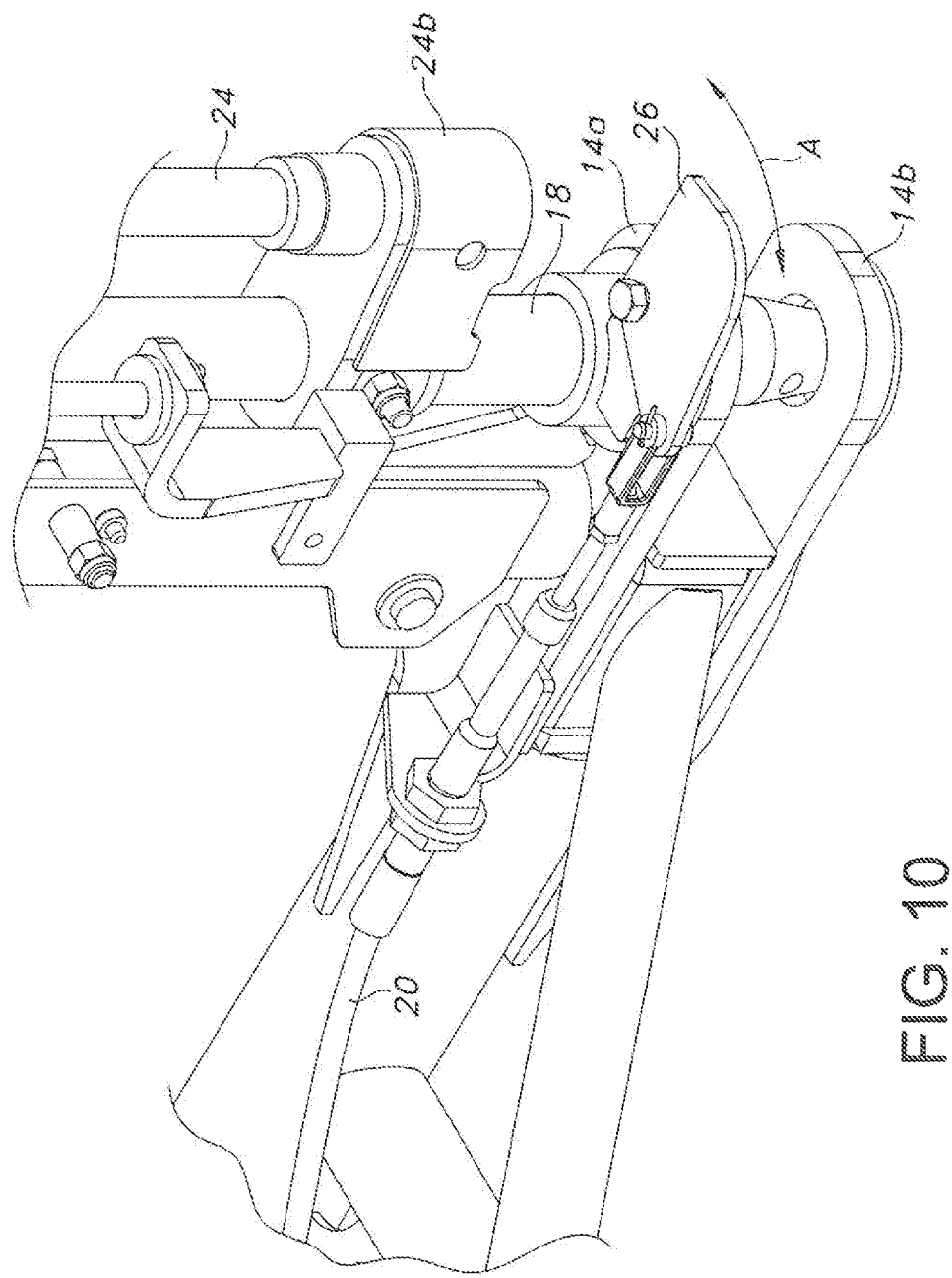
FIG. 10 is a partially cutaway close-up view of one aspect of the fly connection system according to the disclosure.
Figure 11:
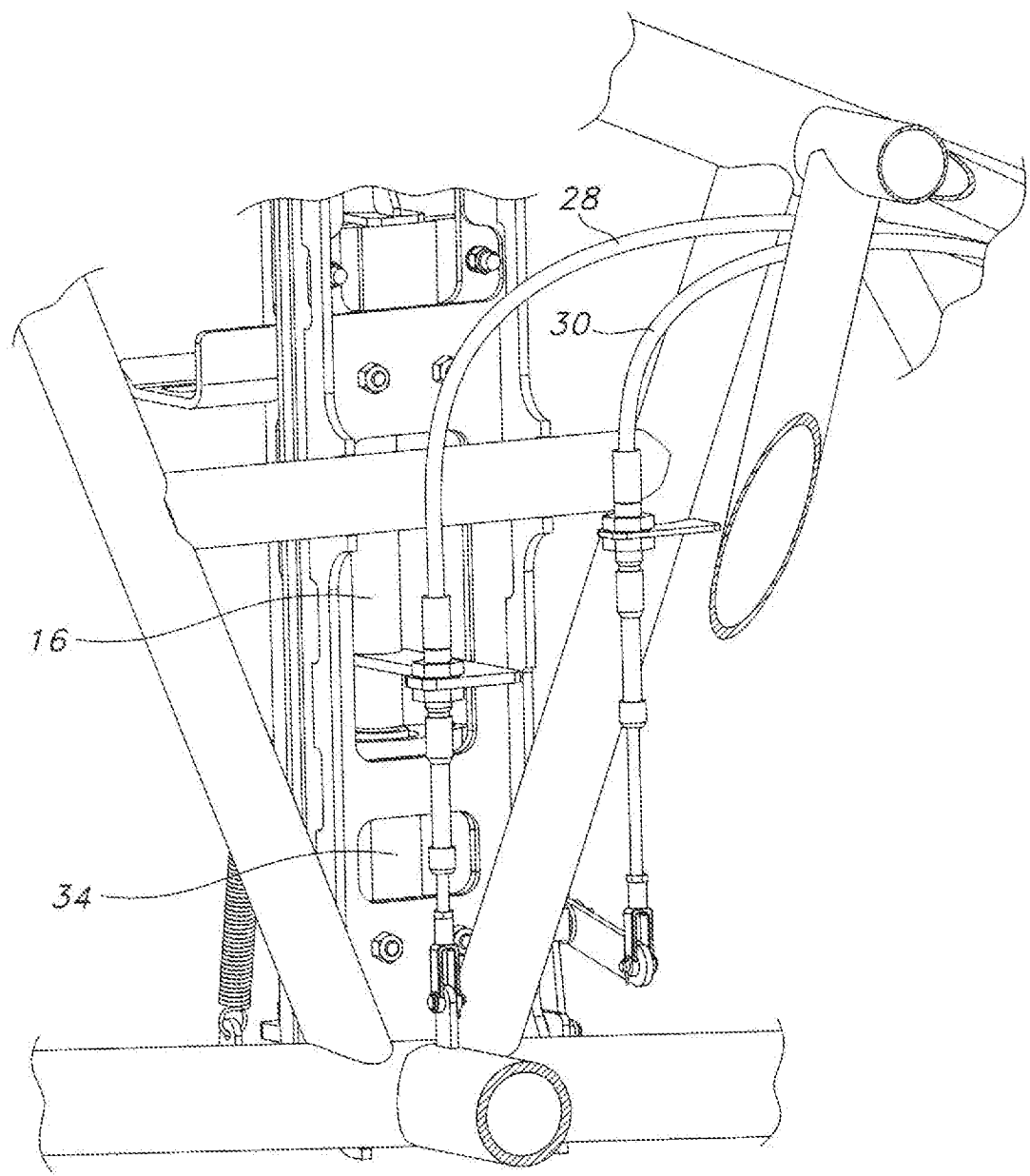
FIG. 11 is a partially cutaway close-up view of one aspect of the fly connection system according to the disclosure.

In order to prevent unintended access to the actuator 24, a first cover 26 may be provided that has a blocking condition (FIG. 6) and a withdrawn condition (FIG. 10; note action arrow A). Movement of the cover 26 may be controlled by a first controller in the form of a cable 28. As illustrated in FIG. 11, the cable 28 is operatively connected to the secondary connector 16, which as mentioned above retains the fly 14 in the non-operative condition, at least until the first primary connector 18 is connected to the boom 12. The arrangement is such that when the secondary connector 16 is in the operative condition, the cable 28 withdraws the cover 26 from blocking access to the actuator 24, thus allowing the operator to access the head 24a with a tool aligned with a rotational axis of the actuator. However, it can be appreciated that, until the fly 14 is moved such that the block 22 is withdrawn, the operator is further precluded from installing the first primary connector 18, and has a visual reference to appreciate the condition of the connection.

Once the fly 14 is pivoted into position such that the block 22 is withdrawn from the blocking condition (again, 14' in FIG. 2B), the first primary connector 18 may be installed using the associated actuator 24 (see FIG. 10). As can be understood with reference to FIGS. 6 and 11, a second controller in the form of a cable 30 is associated with the first primary connector 18, such that upon installation, a second cover 32 covering (and thus preventing direct access to) an actuator 34 associated with the secondary connector 16 is withdrawn from an operative position (see FIGS. 12 and 13), which exposes a head 34a of the actuator 34 for connection to a tool, also along an axis of rotation of the actuator (which is aligned with the connector 16 in this embodiment, but could be offset as well). It should also now be understood that, as long as block 22 is preventing the installation of the first primary connector 18, the cable 30 cannot be actuated, as necessary to withdraw the second cover 32 and expose the head 34a of the actuator 34.

Figure 12:
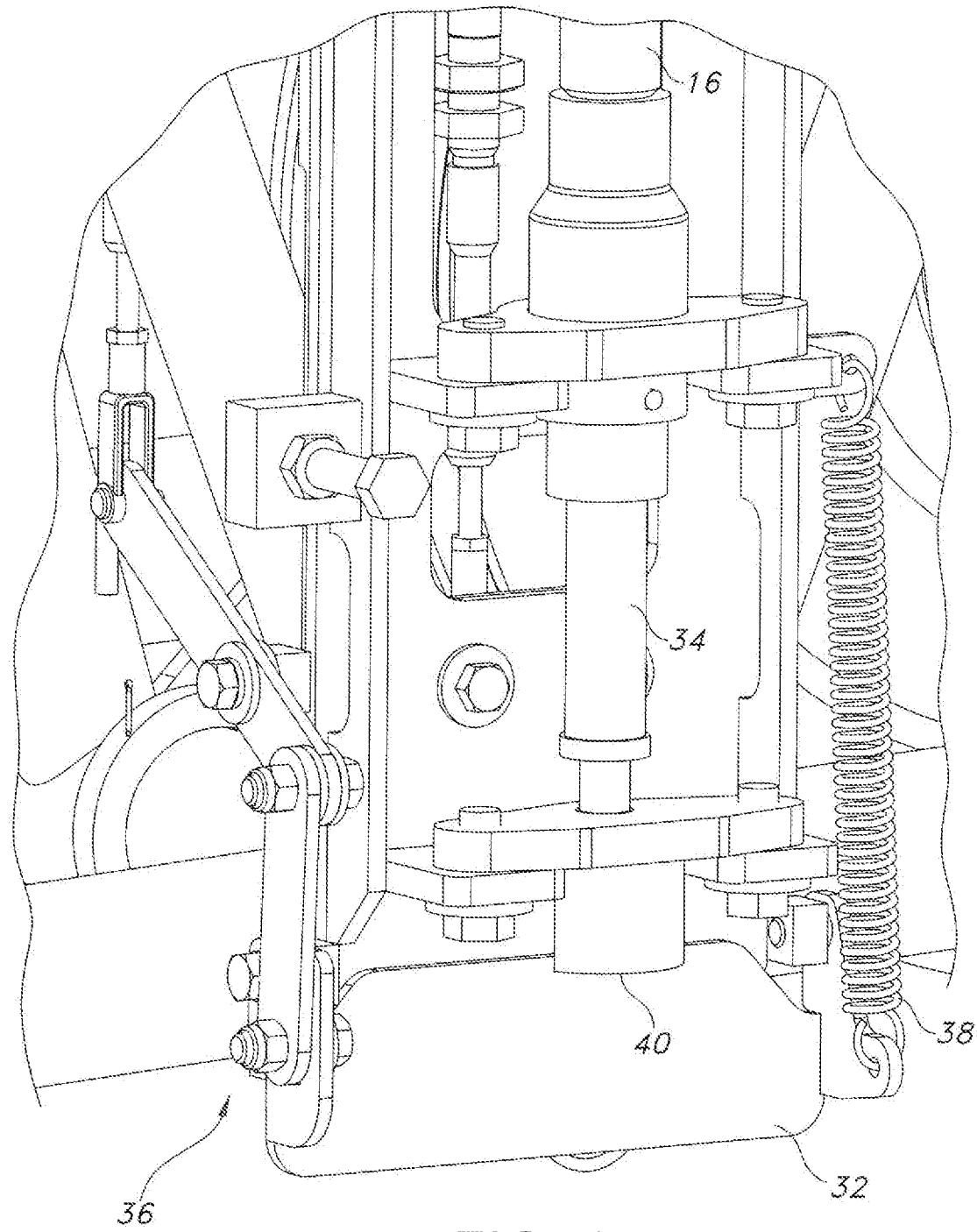
FIG. 12 is a partially cutaway close-up view of one aspect of the fly connection system according to the disclosure.
Figure 13:
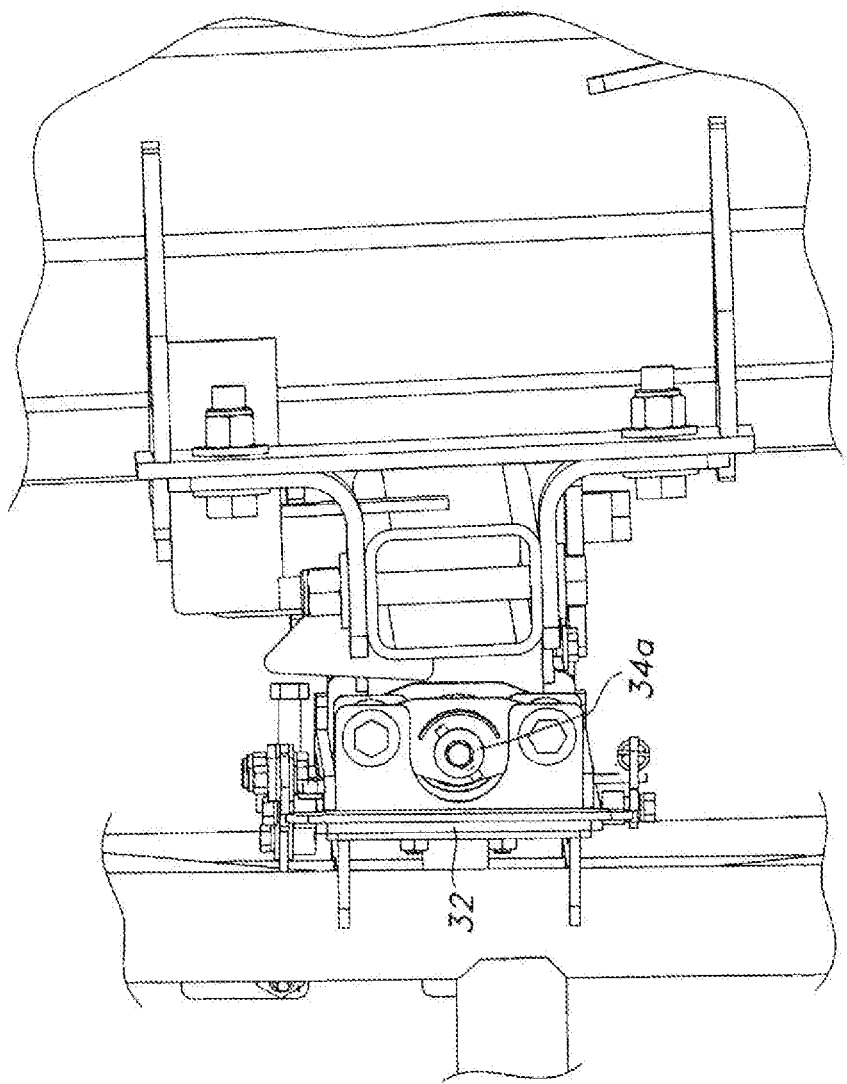
FIG. 13 is a partially cutaway close-up view of one aspect of the fly connection system according to the disclosure.

As can be appreciated from FIG. 12, movement of the second cover 32 between the blocking and withdrawn conditions (compare FIGS. 3 and 4) may be achieved using a linkage 36. An associated spring 38 may be provided to bias the second cover 32 toward the closed position, which force must be overcome by the cable 30. The spring 38 also provides an assist function for closing the cover 32 upon withdrawal of the first primary connector 18, and thus may account for any deadband in the cable 30 (which may be intentionally provided to help ensure that the second cover 32 is not removed before the connector 18 has been extended a sufficient distance to establish the connection). An optional fixed cover, such as shroud 40, may also be provided to fully guard against accessing the actuator 34, except for when the cover 32 is withdrawn.

Withdrawal of the secondary connector 16 thus causes the first cover 26 to move to the blocking position covering the actuator 24, and thus prevents the first primary connector 18 from being withdrawn. The fly 14 may then be fully pivoted about the first primary connector 18 to the inline condition (e.g. from position 14" in FIG. 2C to position 14'" in FIG. 2D). As noted above, the second primary connector 20 is then installed in place to secure the fly 14 to the boom head D.

Figure 14:
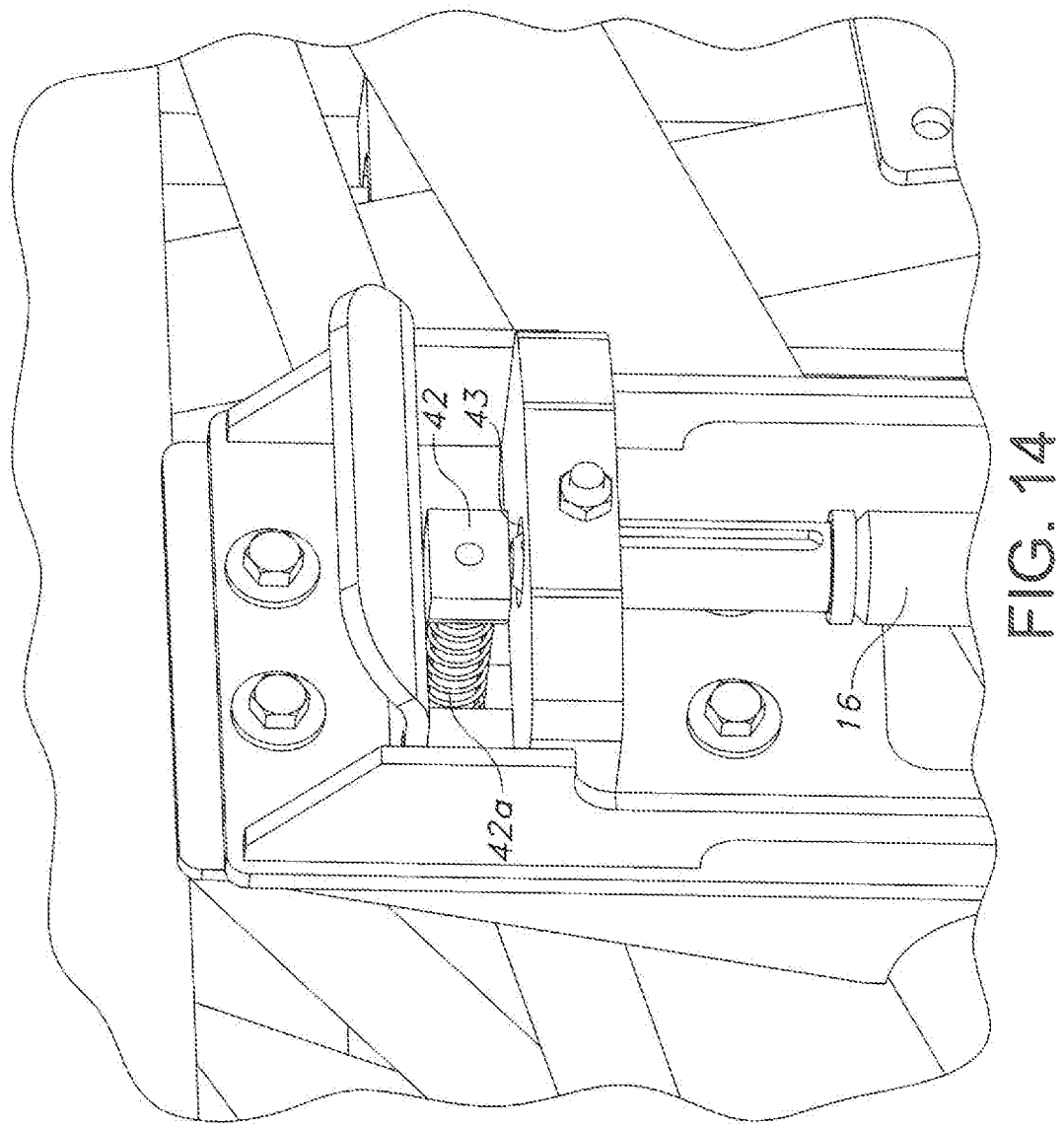
FIG. 14 is a partially cutaway close-up view of one aspect of the fly connection system according to the disclosure.

Stowing the fly 14 alongside the boom 12 is easily and reliably achieved using essentially the opposite sequence of events. The second primary connector 20 is withdrawn, and the fly 14 pivoted about the first primary connector 18 to the partially stowed condition alongside the boom 12. In this condition, a receiver (such as a mount or mounting bracket) associated with the boom 12 may engage a block 42 (see FIG. 14) for blocking the aperture 43 for receiving the secondary connector 16 until the proper association is made. Similar to block 22, the block 42 may be biased or urged toward the blocking condition by a spring 42a, the biasing force of which is overcome by the receiver (which it should be appreciated may be similar to receiver 13, and may include the aperture for receiving the secondary connector 16). As can be appreciated, in this position, block 42 prevents the connector 16 from moving an amount necessary to withdraw the first cover 26 from blocking the actuator 24. In this regard, it is noted that block 42 may be replaced by a structure similar to block 22.

The actuator 24 remains in the blocked condition via cover 26 until the secondary connector 16 is installed. Cable 28 as a result of the movement of connector 16 moves the cover 26 to expose the actuator 24 for use in withdrawing the first primary connector 18. Withdrawing the first primary connector 18 thus moves the second cover 32 to the blocking condition covering the actuator 34 and thereby preventing access to it. The fly 14 may then be pivoted to separate it fully from the head D of the boom 12. This movement allows the block 22 to return automatically to the condition blocking the receivers 14a, 14b, and thus prevent re-installation of the connector 18.

In summary, the system described above provides a measure of protection against an operator following an incorrect sequence for withdrawing the connectors 16, 18 for connecting the fly 14 to the boom 12 during movement between operative and stowed conditions. Blocks 22, 42 may prevent the insertion of the connectors 16, 18 when the fly 14 is not properly associated with the boom 12, thereby providing a level of added protection against misuse. Covers 26, 32 also serve to selectively block access to actuators 24, 34 for inserting the connectors 16, 18 in a manner that prevents inadvertent detachment of the fly 14 from the boom 12. The arrangement is such that the operator cannot through the use of tools apply force to the connectors 16, 18 and overcome any stop or like measure, since access to the connectors is fully blocked. The use of the offset actuator 24 also may make it easier to install and withdraw the connectors (here, connectors 18, 20) using tools or the like.

The foregoing description of certain embodiments provides the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. An interlock system for connecting a boom section to a boom, comprising:
   first and second connectors for connecting the boom section to the boom;
   an actuator for actuating the first connector; and
   a first cover configured to move between a blocking condition and a withdrawn condition, whereby in the blocking condition the actuator is covered by the first cover when the second connector is withdrawn from a position for connecting the boom section to the boom and in the withdrawn condition the first cover is withdrawn from blocking access to the actuator such that the actuator is uncovered by the first cover.

2. The interlock system of claim 1, further including a second cover for covering access to a second actuator for actuating the second connector when the first connector is withdrawn from a position for connecting the boom section to the boom.

3. The interlock system of claim 1, further including a first aperture on the boom section for receiving the first connector, and a first block for blocking the first aperture when the first connector is withdrawn from a position for connecting the boom section to the boom.

4. The interlock system of claim 3, further including a second aperture on the boom section for receiving the second connector, and a second block for blocking the second aperture when the second connector is withdrawn from a position for connecting the boom section with the boom.

5. The interlock system of claim 3, further including a first mount on the boom for moving the first block from blocking the first aperture.

6. The interlock system of claim 3, further including a second mount on the boom for moving the second block from blocking the second aperture.

7. The interlock system of claim 2, further including a first controller for controlling the movement of the first cover based on the movement of the second connector.

8. The interlock system of claim 7, further including a second controller for controlling the movement of the second cover based on movement of the first connector.

9. The interlock system of claim 1, wherein the actuator comprises a screw axially offset from the first connector, the screw having a head adapted for engaging a tool, the head being covered by the first cover in the operative condition.

10. An apparatus for extending the reach of a boom, comprising:
    a boom section for connecting to the boom via a first connector for associating with a first receiver on the boom section;
    a first block for blocking the first receiver in an operative condition to prevent the first connector from entering the first receiver; and
    a spring for biasing the first block to the operative condition.

11. The apparatus of claim 10, wherein the first block comprises a plate mounted to the boom section for at least partially covering the first receiver in the operative condition.

12. The apparatus of claim 11, wherein the plate is movably mounted, and the boom includes a mount for automatically moving the plate from the operative condition.

13. The apparatus of claim 12, wherein the first block comprises a pin mounted to the boom section for at least partially blocking the first receiver in the operative condition.

14. The apparatus of claim 10, further including a second block for blocking a second receiver in an operative condition to prevent a second connector from connecting the boom section to the boom.

15. The apparatus of claim 10, further including:
    an actuator for actuating the first connector; and
    a first cover for covering the actuator when the second connector is withdrawn from a position for connecting the boom section to the boom.

16. The apparatus of claim 15, further including a second cover for blocking access to a second actuator for actuating the second connector when the first connector is withdrawn from a position for connecting the boom section to the boom.

17. The apparatus of claim 16, further including a first controller for controlling the movement of the first cover based on the movement of the second connector.

18. The apparatus of claim 17, further including a second controller for controlling the movement of the second cover based on movement of the first connector.

19. A method of providing an interlock system for use in connection with a boom section for being attached to a boom by an operator, comprising:
    providing a first actuator for actuating a first connector for connecting the boom section to the boom;
    blocking the operator's access to the first actuator via a cover unless a second connector is connecting the boom section to the boom;
    covering the first actuator by the cover when the second connector is withdrawn from a position for connecting the boom section to the boom; and
    uncovering the first actuator by withdrawing the cover.

20. The method of claim 19, further including the step of blocking the operator's access to a second actuator for the second connector unless the first connector is connecting the boom section to the boom.

21. The method of claim 20, further including the step of using the first connector to connect the boom section to the boom, unblocking the operator's access to the second connector, and withdrawing the second connector from connecting the boom section to the boom.

\* \* \* \* \*